Figure 12:
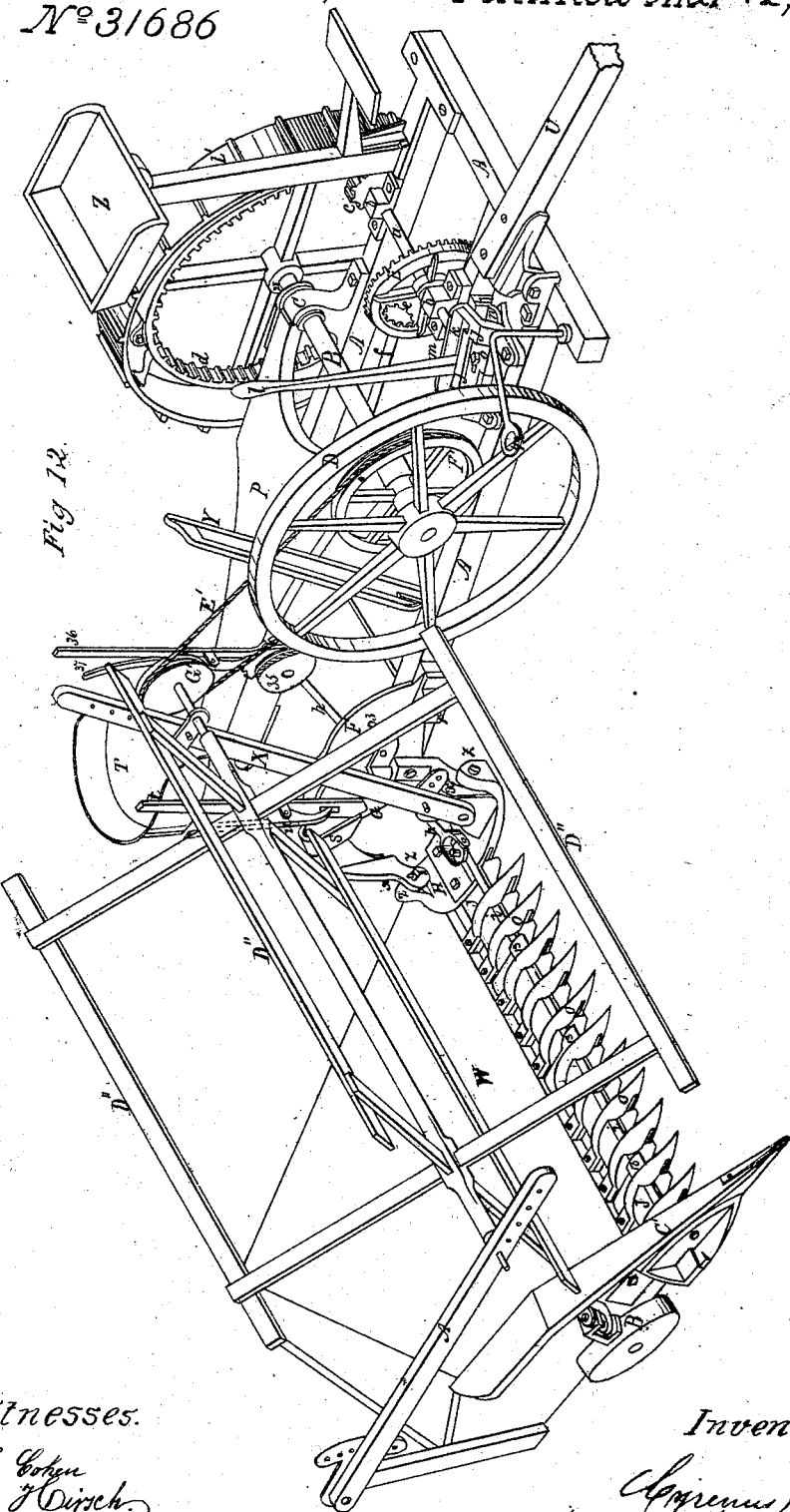

C. Wheeler, Jr.
Mower.
Nº 682
Nº 31686
Patented Mar. 12, 1861.
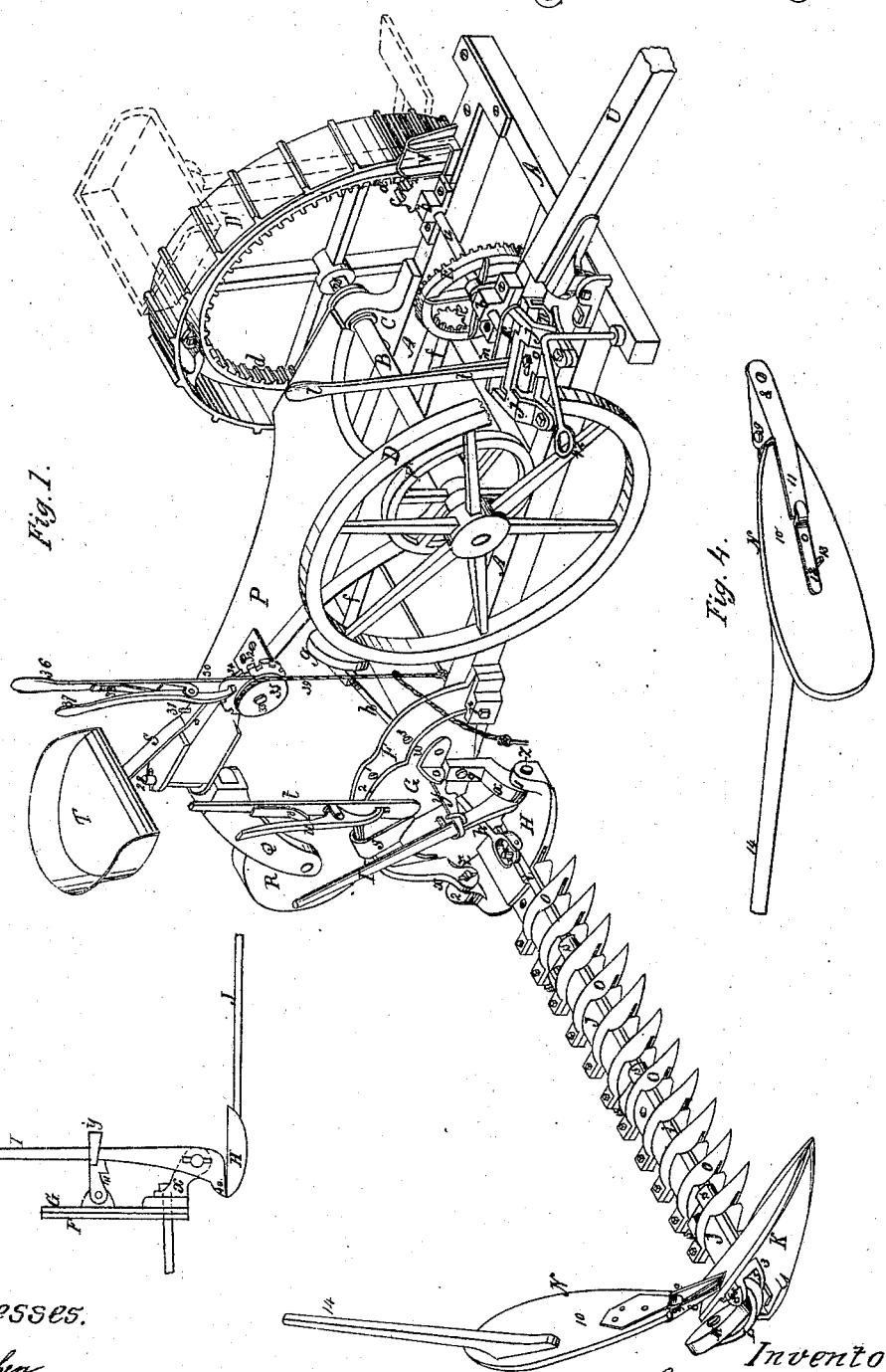
Witnesses.
E. Cohen
S. Hirsch
Inventor.
Cyrenus Wheeler Jr.
by Atty A. B. Stoughton Sheet 2 - 3 Sheets
C. Wheeler, Jr.
Mower.
Patented Mar. 12, 1861.
N° 682
N° 31686
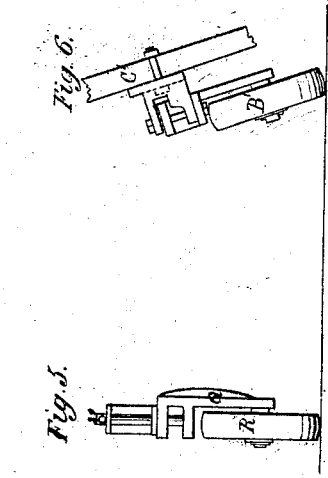
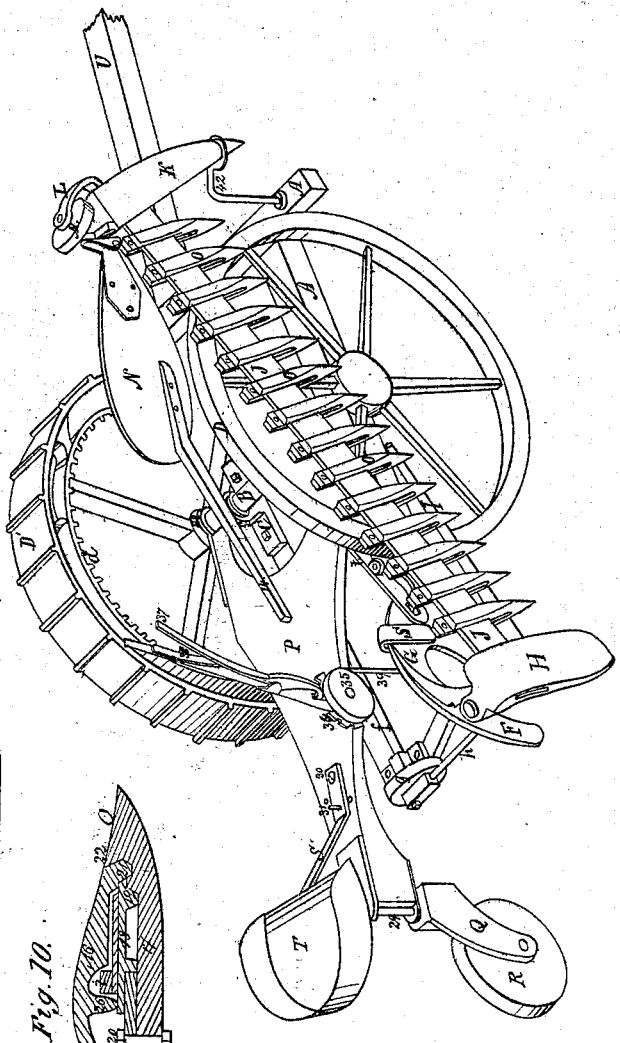
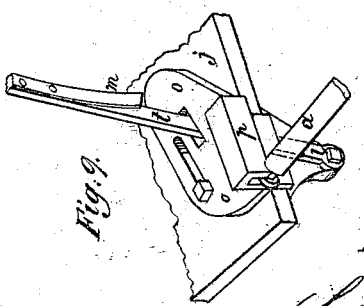
Witnesses.
Inventor.
Cyrenus Wheeler Jr.
by Atty A. B. Stoughton Sheet 3 - 3 Sheets.

C. Wheeler, Jr.
Mower.

N° 682
N° 31686

Patented Mar. 12, 1861.

Witnesses.
E. Cohen
S. T. Hirsch

Inventor.
Cyrenus Wheeler Jr
by Atty A. B. Stoughton

UNITED STATES PATENT OFFICE.

CYRENUS WHEELER, JR., OF POPLAR RIDGE, NEW YORK.

IMPROVEMENT IN REAPING AND MOWING MACHINES.

Specification forming part of Letters Patent No. 31,686, dated March 12, 1861.

*To all whom it may concern:*

Be it known that I, CYRENUS WHEELER, Jr., of Poplar Ridge, in the county of Cayuga and State of New York, have invented certain new and useful Improvements in Combined Mowing and Reaping Machines; and I do hereby declare the following to be a full, clear, and exact description of the same, reference being had to the accompanying drawings, making a part of this specification, in which—

Figure 1 represents a perspective view of the machine when arranged for mowing grass. Figs. 2, 3, 4, 5, 6, 7, 8, 9, 10 represent details of the machine, which will be hereinafter referred to. Fig. 12 represents in perspective the machine as arranged for reaping grain. Fig. 11 represents in perspective the machine (when arranged for mowing grass) as having its finger-bar folded up for transportation from place to place.

Similar letters of reference, where they occur in the several figures, denote like parts of the machine in all of the drawings.

This invention relates to a combined reaping and mowing machine convertible to either purpose and embracing the necessary elements to adapt it to either use. The leading characteristics of the machine are the subject-matter of Letters Patent heretofore granted to me; and this invention consists in the details of the machine, which may be briefly enumerated as follows: the arrangement for folding the cutter and finger-bar, the manner of hanging the seat-frame and the main frame to the axle of the machine, the clutching and unclutching devices, the device for keeping the reel-belt on its pulleys, the hinged hook and latch for catching in one position and locking in another position, the lever and the finger-bar, the manner of hanging the outside caster-wheel, the lock on the track-clearer for making it yielding or rigid, and the plate under the cutters and the method of holding it there. I thus briefly enumerate the points in the invention to which I propose to extend my claims, but will hereinafter more fully and specifically point out their construction and combinations with each other, and with the machine generally, to affect the objects for which they are designed.

To enable others skilled in the art to make and use my invention, I will proceed to describe the same with reference to the drawings, and first as adapted to mowing grass.

A rectangular frame, A, is suspended to the axle B by suitable boxes, C, so that it may swing on said axle. On this axle B, and outside of the frame A, are the two main carrying and supporting wheels D D', the latter, D', being also a driving-wheel, and for this purpose revolving with the axle, while its mate or fellow, D, is loose on and may turn independent of the axle.

On the front part of the main frame A there is a shaft, $a$, supported in boxes $b$. One end of this shaft has upon it a pinion, $c$, that gears with the cogs $d$ of the drive-wheel D', and thus a rotating motion is communicated to this shaft $a$, and through it to the cutters, as follows: A bevel-gear wheel, E, on the shaft $a$ meshes with a bevel-pinion, $e$, on a shaft, $f$, that extends rearward and inclines downward and rotates said shaft $f$. The shaft $f$ has a crank-wheel, $g$, on its extreme rear end, and to a wrist-pin in this crank-wheel the pitman $h$ is attached by one of its ends, the other end thereof being connected to the cutter-bar $i$, and through this gearing the cutter-bar is vibrated. In order that the cutter-bar may be at rest when the machine is not cutting grass or grain, I have arranged a clutching and unclutching apparatus for engaging or disengaging the bevel-wheel E and the bevel-pinion $e$, as follows: A plate, $j$, is bolted to the main frame, in the top of which there is an oblique slot, $k$, that has a recess at both ends of it, so as to receive and hold a lever, $l$, that works through said slot when said lever comes opposite either of said recesses, it being thrown and held in them by a spring, $m$, upon its side, that presses it in that direction. Underneath the slot there is a way, $n$, that inclines in the same direction with said slot, and upon this way $n$ a carriage-plate, $o$, is moved, that has a flange, $p$, upon it, that projects into a groove formed in the axle or shaft $a$, so that sliding the plate $o$ obliquely moves the shaft endwise, drawing it away from or forcing it up to the pinion $e$, as the case may be, and in either case the lever is held at the end of its motion by one or the other of the recesses in the oblique slot $k$, into which it is thrown by its spring $m$. To move the lever it is first forced against its spring $m$ until it leaves the recess, then moved in the direction of the slot.

At the rear end of the main frame, and on the grain side thereof, there is bolted a plate, F, and to this plate, or through it, and to the main frame is pivoted by a pivot-bolt, $q$, a movable plate, G, that is in contact or close proximity to the stationary one F. The plate G, to cause it to move freely on its pivot without being shackling, moves through a guide-piece, $r$, at its front, and has a restraining-piece, $s$, toward its rear, which steadies it to the rigid plate F. To an upright piece, $t$, connected to the moving plate G, there is pivoted a lever, $u$, with a spring, $v$, behind it. The lower end of the lever is bent into a hook form, and passing through an opening in its own plate will catch, if unrestrained, into one of the series of holes, 1 2, &c., in the stationary plate F, and thus lock the two plates together. By slipping a ring over the upright $t$ and over the lever $u$, so as to hold them close together, this locking cannot take place, and then the plate G can move on its pivot until its shoulder $w$ comes against a pin set in the hole 3, where it is stopped, that pin being at a point where it will catch the finger-bar before the points of the fingers would be apt to run into the ground by their downward inclination. The plate G has other devices connected with it—viz., the projections $x\ x$, to which the shoe H is pivoted, and a hinged hook and latch, $y$, which holds the lever I in two positions, as will be described hereinafter. The shoe H is pivoted to the arms or projections $x\ x$ at $z\ z$ through the lugs 1 2 at its front and rear, and the finger-bar J is connected to the shoe by means of a recess, and bolts or rivets to give it the proper degree of strength. To the outer end of the finger-bar is attached the outside divider K. This divider has a recess, 3, Figs. 1, 7, 8, in it, in which is secured a plate, 4, having horizontal lugs 5 on it, through which an inclined pivot-pin, 6, passes to form a hinge for the curved shank L, to which the outside caster-wheel, M, is hung. When the machine is drawn forward, the caster-wheel and its curved shank swing backward and behind the path of the divider K, as seen at Figs. 1, 7, which allows the finger-bar and its several appliances to come down close to the ground; but when the machine is being "geed around," the caster and its shank swing into the position shown in Fig. 8, which raises up the shoe or divider and outer end of the finger-bar, as shown by the comparative height of the divider above the horizontal line under the casters in Figs. 7 and 8. I use but one shank for my caster-wheels, said wheels being hung to the side of the shank. This enables me to more readily clear the caster of any straw or grass that may wind around and choke it.

To the rear end, 7, of the outside divider K is bolted or pivoted the track-clearer N, which is made as follows: a metallic shoe-piece, 8, at its point, by which it is secured to the divider K. This shoe-piece has flanges or lugs 9 turned upon it, through which a vertical pivot passes to form a hinged connection between said shoe and the vertical (or nearly so) board 10. The back of the shoe-piece 8 extends rearward and forms a shank, 11, which lies snugly up against the board 10. On the outside of the board 10 there is a pivoted catch, 12, (see Fig. 4,) which, when let down upon its stop 13, overlaps the shank-piece 11, and thus makes the shoe and board rigid, and as though made of one piece; but by raising up the rear end of the catch-piece 12 to a vertical (or nearly so) position it releases the catch-piece and the board will swing freely in one direction—viz., away from the standing grass—on its hinged connection. The track-clearer may thus be a rigid or a hinged one, as may be preferred, or as its special duty may require. 14 is the handle by which the track-clearer may be handled or moved. The object of the track-clearer is too well known to need any further description of it.

$o$ are the fingers or guards on the finger-beam J, and 15 are the guides thereon for the cutter-bar $i$ to work through. The construction of the guard and the action of the cutter therein will be more clearly understood by reference to Fig. 10, where an enlarged sectional view of a guard and its several parts is seen. The guard is cast in two pieces—an upper one, 16, and a lower one, 17—each having projections and recesses, as seen in said Fig. 10. In a recess in the lower part, 17, is placed what I term a "cutter-plate," 18, resting upon its lugs 19 in said recess. The upper portion, 16, after the lower portion, 17, is bolted to the finger-bar, as at 20, and the cutter-plate laid in, has its point 21 slipped under the cap 22, and then brought down until its rear 23 comes upon the rear portion, 24, of the under part, where the two parts are bolted together, as at 25. The projection 26 rests upon the heel of the cutter-plate, keeping it firmly in place, and the other one, 27, rests behind the finger-bar, so that the two bolts 20 and 25 hold the fingers to the bar and its parts to each other, and also the cutter-plate in its proper position, leaving room for the cutter-bar and its knives to freely play through. The object of the cutter-plate is to make a sheer edge, as it were, for the cutters to cut against. This construction and connection of guards affords easy access, removal, replacement, or repair of any of its parts or appliances.

P is a second frame, hinged to the axle at 28 and extending rearward and over the rear portion of the main frame. At the rear of this second frame is pivoted by a vertical pivot, 29, the shank Q, which has connected to it the caster-wheel R, this caster-wheel, like the one, M, above described, being hung to the side of the shank to facilitate the removal of any straw or grass which may wind around its journal or between it and its shank, which will occur notwithstanding the greatest precaution to avoid it. This caster-wheel may be also so hung as to slightly raise up its frame when the machine is being turned around and let it down again when the machine starts forward; and as the main frame is sometimes suspended to this second frame, this raising and lowering may be important. To the second frame, P, is pivoted at 30 the seat-support S, which carries the seat T, and by a series of holes and a pin, 31, the position of the seat may be varied to allow the driver to face the team or the cutters, whichever requires his attention most. A plate, 32, is bolted to P, which has a journal, 33, projecting from it, and a ratchet-arc, 34, fastened to it. On the journal 33 is placed, so as to turn freely thereon, when required, a pulley, 35, and a post or upright, 36, fastened to it; and to this post or upright 36 is pivoted a lever, 37, the hooked end of which passes through an opening in the standard or post and takes into the ratchet-teeth on 34, it being thrown in that direction by the action of the springs 38. A chain, 39, which is fastened to the main frame, is hooked to the pulley 35, so that the operator by seizing the lever and upright can raise or lower the main frame at pleasure. When the main frame is suspended to the second frame, P, they can only move together upward by anything coming under the rear caster, R; but the flexibility of the chain 39 will allow the main frame to rise independently of the rising of the second frame, though suspended to it; and when the main frame is let down and the chain slackened, either frame may move on the axle independent of the other.

The lever I, Fig. 3, has a foot, 40, on it, which bears upon the top of the shoe H. By seizing this lever and drawing it toward the main frame the driver or operator may raise up the outer end of the finger-bar, and the latch 41, catching over a pin in the lever, will hold it thus raised up. The hook $y$ keeps the lever up within reaching distance of the operator from his seat. The lever $u$ and post $t$ are for raising or lowering the points of the fingers. When the finger-bar is to be folded up into the position shown in Fig. 11 for transportation, it may be first raised up into a perpendicular position, the pin is drawn from the hole 3, the lever $u$ is pulled back to its post $t$, and the plate G, to which the finger-bar is pivoted, is free to turn forward, and the finger-bar with it, until the point of the outside divider K rests in a supporting-arm, 42, on the front of the frame A, where it will ride well balanced, the arm 42 preventing it from swinging in or out.

The tongue U is hinged to the front of the main frame, at one side thereof, to counteract side draft, and opposite to it, at the other corner, is a shoe, V, for receiving the post that sustains the driver's seat, as shown in red lines, when the machine is converted into a reaper, as will be hereinafter explained.

Fig. 2 represents a reel-post which is used when the machine is arranged for reaping grain, and Fig. 6 represents a caster which belongs to the grain-table. Both of these will be more particularly mentioned in describing the arrangement for reaping, and to which they properly belong.

To convert this machine from a mower to a reaper, the track-clearer N, the outside caster, M, and the lever I are removed. The grain-table W is adjusted and bolted to the finger-beam. The reel-post X, Figs. 2 and 12, is fitted on where the lever I comes off. The belt-guide Y is set in the socket prepared for it. The driver's seat Z is set in the shoe V. The platform or grain-table has upon it the outside reel-post, A', and its inclined caster B', and a long divider, C', that lies up against the shoe K, but projects beyond it, and when the reel D'' is set in its supports, and the band E' adjusted over its pulleys F' G', and through the guide Y, and the finger-bar set up or raised to the proper height, the machine is ready for reaping grain. The necessity of the belt-guide is this: that the outer end of the finger-bar and the platform are still free to rise and fall to the slopes of the ground, and if not controlled, the reel-shaft, moving with the platform, would throw off the belt; but the guide Y prevents it, as any end motion of the reel-shaft is not transmitted to the belt beyond said guide.

It is unnecessary to further describe in detail the construction of the parts which convert the machine from a grass to a grain cutting machine. It has all the necessary elements within itself for either work. The finger-bar can be raised or lowered at either end or at both ends. It can be turned to raise or lower the points of the guards. It can conform to the ground at one end or at both ends. It is self-yielding or flexible. It can be folded up out of the way and work with or without the grain-table.

The seat T, mounted on the frame P, serves the double purpose of a driver's seat when mowing grass, and a raker's seat when reaping grain. On the foot of the reel-post X there is a projection, 43, by which it is secured to the lug 1 on the shoe H, and also an arc, 44, furnished with holes for lowering or raising and holding the reel-post when adjusted. When the machine is arranged for cutting grass, or the reel removed, the reel-post is also taken off, and when the reel-post is on the lever I is removed.

Having thus fully described the nature and objects of my invention, what I claim therein as new, and desire to secure by Letters Patent, is—

1. The combination of the hinged shoe H and pivoted plate G for allowing the finger-bar connected with said shoe to be folded to or around by the main frame, and be supported by and carried on its hinges, substantially as herein described.

2. The combination of the two frames A P, connected to the same axle, the former supporting the gearing and cutting apparatus, and the latter extending rearward, and by means of its caster supporting the driver or conductor, and a raising and lowering apparatus for raising, lowering, or suspending the frame A upon itself, substantially as described.

3. The combination of the pivoted plate G, carrying the finger-bar, the stationary plate F, the guides r s, and the lever u for allowing one plate to move freely and truly upon the other, and for holding them rigid when desired, substantially as described.

4. The clutching and unclutching mechanism composed of the obliquely-slotted stationary plate j, the inclined movable plate o, with its flange p, and the lever l, arranged substantially as described.

5. In combination with a hinged finger-bar and platform that are free to rise and fall at their outer ends, and that carry the reel-supports, a belt-guide on the main frame, to prevent the end motion of the reel-shaft from throwing the belt off from its driving-pulleys, substantially as described.

6. In combination with the pivoted lever I, and its catch-pin, and foot 40, resting upon the shoe H, the hinged hook and latch y for catching in one position, and holding the lever and the finger-bar in another position, substantially as described.

7. The manner of holding the cutter-plate 18 in place by means of its own projections and those upon the upper part of the finger, substantially as described.

8. Hanging the casters to one side of a shank that is in turn hinged by an inclined pivot-pin, so that they will freely swing around to ease the machine in turning, and be easily got at to be cleaned of all grass or straw that may wind around them or their journals, substantially as described.

9. In combination with a hinged track-clearer, the lock 11 12, for the purpose of making said track-clearer rigid or flexible, as occasion may require, substantially as described.

CYRENUS WHEELER, Jr.

Witnesses:
   A. B. STOUGHTON,
   E. COHEN.